June 29, 1937.  W. W. P. STELTER  2,085,174
FEEDER FOR CORN SHREDDERS AND THE LIKE
Filed March 4, 1935   2 Sheets-Sheet 1
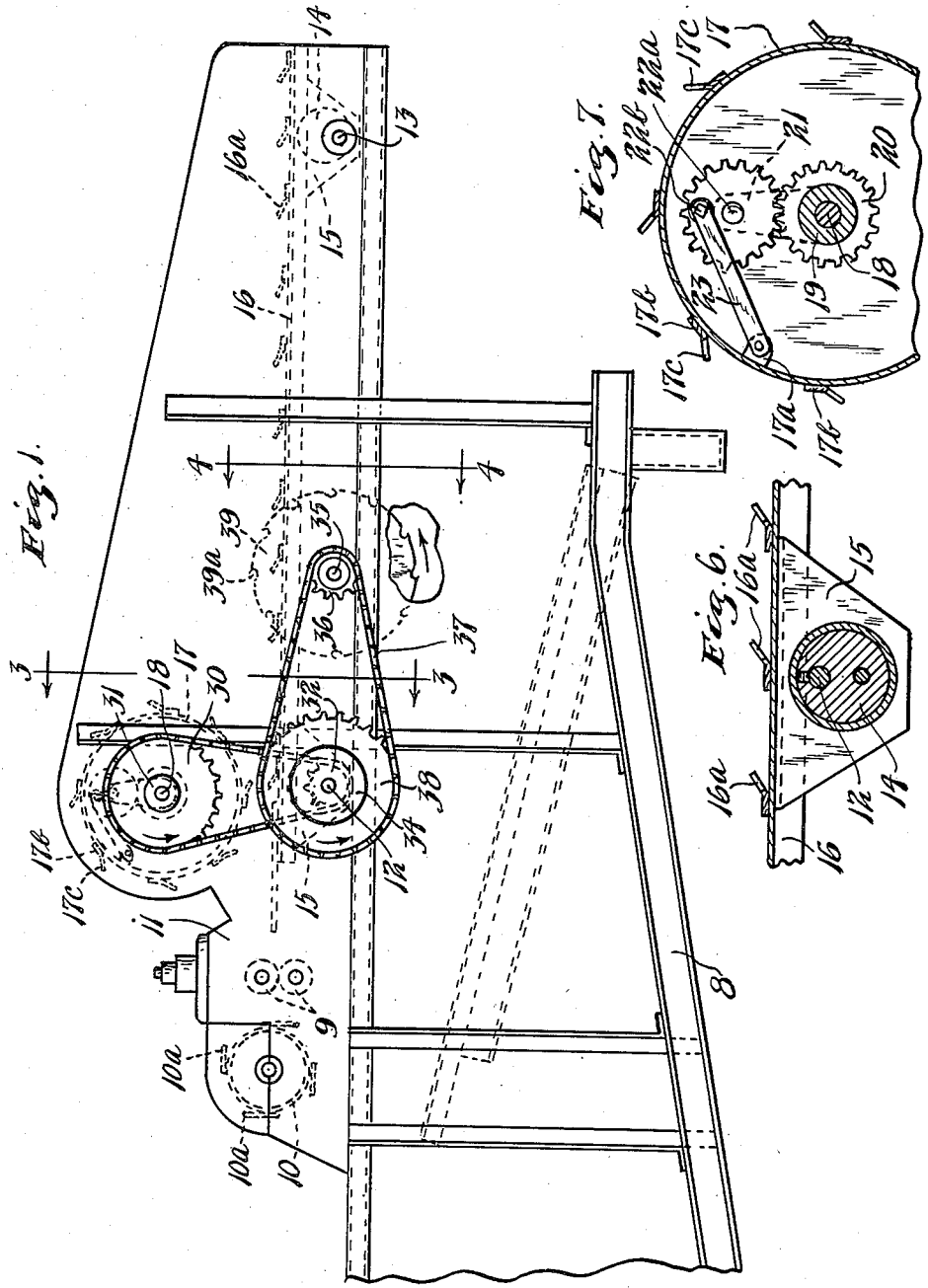
INVENTOR.
WALTER W. P. STELTER.
BY HIS ATTORNEYS.
Williamson & Williamson

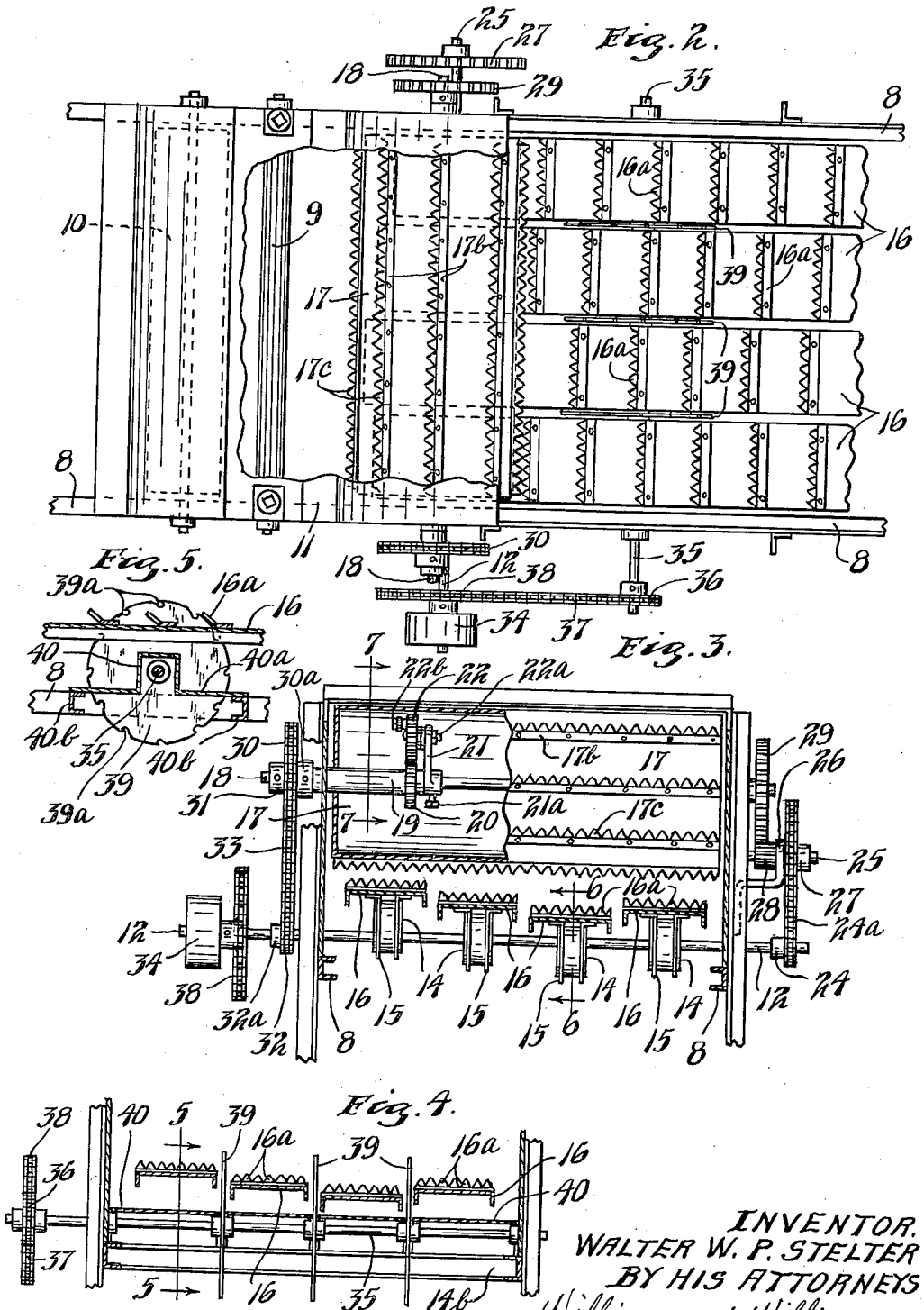

Patented June 29, 1937

2,085,174

UNITED STATES PATENT OFFICE 2,085,174

FEEDER FOR CORN SHREDDERS AND THE LIKE

Walter W. P. Stelter, Echo, Minn.

Application March 4, 1935, Serial No. 9,200

8 Claims. (Cl. 130—33)

My invention relates to feeders for corn shredders and other similar apparatus.

It is a general object of my present invention to provide improvements on my previous invention disclosed in my application for patent on "Feeder for corn shredders and the like," No. 2,016,910, issued October 8, 1935.

A more specific object is to provide a feeder for corn shredders and the like incorporating novel and improved means for retarding the upper strata of material being conveyed.

Still another object is to provide novel driving means for such retarding means which normally drives said retarding means in a forward direction and at predetermined periods of time automatically reverses the retarding means for a short time.

A further object is to provide a feeder of the class described incorporating novel means for breaking the twine with which bundles of corn or the like are bound.

These and other objects and advantages of the invention will be more fully set forth in the following description made in connection with the accompanying drawings, in which like reference characters refer to similar parts throughout the several views, and in which:—

Fig. 1 is a side view of a corn shredder in which my invention is incorporated, a portion of the machine being broken away and certain internal parts being shown in dotted lines;

Fig. 2 is a top view broken away in portions;

Fig. 3 is a section taken on the line 3—3 of Fig. 1 as indicated by the arrows;

Fig. 4 is a section taken on the line 4—4 of Fig. 1 as indicated by the arrows;

Fig. 5 is a section taken on the line 5—5 of Fig. 4 as indicated by the arrows;

Fig. 6 is a section taken on the line 6—6 of Fig. 3 as indicated by the arrows, and Fig. 7 is a section taken on the line 7—7 of Fig. 3 as indicated by the arrows.

Referring to the drawings, portions of a combined husking and shredding machine shown in Figs. 1 and 2 include a frame 8, a pair of snapping rollers 9 and a rotary cutting head 10 carrying cutter blades or knives 10a, all of these parts being of conventional construction, being conventionally disposed and being power driven by any suitable means. The cutting head 10 and the snapping rollers 9 are enclosed in a suitable housing 11 which also encloses certain other parts to be described.

A conveyor, similar to that described and illustrated in my Patent No. 2,016,910, is provided comprising eccentric carrying shafts 12 and 13, eccentrics 14, eccentric encircling members 15 and conveyor decks 16 having teeth 16a. The eccentric carrying shafts 12 and 13 are connected together for rotation at a common speed in a counterclockwise direction, as viewed in Fig. 1, and one of the shafts 12 and 13 is rotated by suitable power driven means, not shown. The upper portion of the housing 11 above the medial and right hand portion of the conveyor decks 16, as viewed in Fig. 1, is left open for access to the conveyor decks 16 in placing bundles of corn stalks or other material thereon.

The portions of the feeder comprising my present invention will now be described in detail.

Novel retarding means is provided for retarding the upper strata of the body of material being moved toward the snapping rollers 9 by the conveyor decks 16.

A hollow retarder drum 17 is revolubly mounted above the delivery end of the conveyor decks 16 with its axis disposed horizontally and transversely of the machine. A shaft 18, disposed axially of the drum 17, is suitably journaled at its right hand end, as viewed in Fig. 3, in a wall of the housing 11. A sleeve 19 is revolubly mounted on the left hand end of the shaft 18 and is suitably journaled in a wall of the housing 11. A gear 20 is mounted on the inner end of the sleeve 19. A lever or arm 21 is mounted on the shaft 18 just inwardly of the gear 20 and is secured on the shaft 18 by suitable means such as the set-screw 21a. A second gear 22, meshed with the gear 20 is revolubly mounted on the free end of the arm 21 by means of a pivot stud 22a. A link 23 is pivotally connected at one of its ends to a stud 22b eccentrically located on the gear 22 and at its other end to a lug 17a formed on the inner periphery of the hollow drum 17.

Suitable means is provided for rotating the shaft 18 and the sleeve 19. A sprocket 24 is mounted on the right hand end of the shaft 12, as viewed in Fig. 3. Above the sprocket 24 a countershaft 25 is journaled in the wall of the housing 11 and in a bracket 26 attached to the housing 11. A sprocket 27, connected with the sprocket 24 by means of a sprocket chain 24a, and a pinion 28 are both mounted on the countershaft 25. A gear 29, mounted on the shaft 18, is meshed with the pinion 28. When the shaft 12 is revolving in a given direction the shaft 18 will obviously be rotated in the opposite direction from shaft 12 but at a much lower speed.

A sprocket 30, having a hub 30a, is mounted on the outer end of the sleeve 19 and a collar 31 is secured on the shaft 18 immediately outwardly of the sprocket 30. The sleeve 19 abuts the collar 31 at one of its ends and the hub portion of the arm 21 at its other end and hence, although free for rotation on the shaft 18, is restrained from longitudinal movement on the shaft 18. A second sprocket 32, somewhat smaller than the sprocket 30 and having a hub 32a, is mounted on the shaft 12 in line with the sprocket 30. A sprocket chain 33 is placed on the sprockets 30 and 32 to connect the same for transmission of rotary mechanical power therebetween. A pulley 34, mounted on the shaft 12, may be connected to any suitable source of rotative mechanical power. Rotative power is applied to the pulley 34 in such a direction that the shaft 18 and sleeve 19 will respectively rotate in clockwise and counterclockwise directions as viewed in Fig. 7. The sleeve 19 rotates at a somewhat higher rate of speed than the shaft 18. The arm 21 rotates in a clockwise direction and, through the link 23, tends to drive the drum 17 in a clockwise direction. The gear 20 has a counter-clockwise rotation relative to the arm 21 and hence will rotate the gear 22 in a clockwise direction. The gear 22 and link 23 will then alternately advance and retard the drum relative to the arm 21. It should be obvious that such advancing and retarding can also be attained by rotating the sleeve 19 and gear 20 in a clockwise direction at a speed greater than the speed of rotation of the shaft 18 and arm 21 so that the gear 22 will rotate in a counter-clockwise direction relative to the arm 21.

From the above it is apparent that the direction and speed of rotation of the drum comprises a steady clockwise component imparted to the drum by the arm 21 through the link 23 and a second component varying in speed and alternating in direction substantially in accordance with simple harmonic motion imparted to the drum by the gear 22 and link 23. The elements transmitting rotative power to the arm 21 and gear 22 are so proportioned that the resultant rotation of the drum 17 derived from the components above described will provide for clockwise rotation of the drum during the majority of the time and counter-clockwise rotation during a small part of the time. Expressed in other words, the drum 17 will be rotated alternately through a predetermined angle in a clockwise direction and through a considerably smaller angle in a counter-clockwise direction. It should be obvious that change in direction of rotation is not abrupt but is effected by smoothly reducing the speed of rotation to zero and then smoothly building up the speed of rotation in the opposite direction.

The periphery of the drum 17 is provided with a plurality of longitudinally disposed bars 17b each carrying a series of material engaging teeth 17c. Each tooth 17c projects outwardly and in a counter-clockwise direction from the bar 17b and the drum 17.

As material is conveyed along the decks 16 toward the snapping rollers 9 the teeth 17c of the retarder drum 17 engage the upper strata of the material during counter-clockwise rotation and retards the same by tending to impart a rearwardly directed movement thereto. During counter-clockwise rotation of the drum 17 there is a tendency for a portion of the material to be carried upwardly on the right hand upwardly moving portion of the drum. When the drum reaches the clockwise part of its cycle of operation any material which has been moving upwardly is then carried downwardly to resume forward movement with the main body of material.

Combined with the above described apparatus is an improved means for breaking the twine with which bundles of corn or other material placed upon the conveyor are bound.

A shaft 35, suitably journaled in the housing 11 is disposed transversely of the frame 8 below the medial portions of the decks 16 and is provided with a sprocket 36 connected by means of a sprocket chain 37 to a second sprocket 38. The shaft 35 will be rotated in the same direction as the shaft 12, which, as previously described, rotates in a counter-clockwise direction as viewed in Fig. 1.

Twine breaking disks 39 are mounted on the shaft 35 in positions aligned with the respective spaces between adjoining ones of the conveyor decks 16. The uppermost portion of each of the disks 39 projects somewhat above the highest level of the conveyor decks 16 as shown. Each disk 39 is provided with a series of spaced twine receiving notches 39a cut into its peripheral portion. Each of the notches 39a is defined by a gently sloping portion of the disk 39 at the side of the notch toward the direction in which the periphery of the disk moves and at the other side by a concavely curved, substantially semicircularly shaped, generally radially disposed portion. The outermost part of each concavely curved notch defining portion of the disk 39 comprises a hook-like twine engaging element and each gently sloping notch defining portion of the disk comprises a surface for guiding twine into the notch partially defined thereby.

It should be noted that each of the decks 16 is in gyratory motion wherein it moves upwardly, then forwardly toward the snapping rolls 9, then downwardly and then rearwardly and that the various decks 16 are in respectively different portions of this cycle of movement. Each of the decks 16 tends to first raise a bundle of material placed thereon, then project the bundle forwardly and finally lower the bundle.

The disks 39 are continuously rotated in a counter-clockwise direction as viewed in Figs. 1 and 5 as long as the feeder is in operation. When bundles of corn stalks or other material bound with twine are placed upon the conveyor decks 16 in longitudinally disposed relation thereto the twine at one point thereof will be brought into contact with the peripheral portion of one or another of the rotating twine breaking disks 39 by means of the above described gyratory movements of the decks 16 and will be received in one of the notches 39a. As the disk 39 continues to rotate, the twine will be pulled downwardly until it breaks due to the stress imposed upon it.

A shield 40, shown in Figs. 4 and 5, encloses the shaft 35 at the top and both sides thereof to prevent pieces of twine from reaching the shaft 35 and becoming wound therearound. The shield 40 is of generally inverted U-shaped cross-section, with wide flanges 40a extending from the free edges thereof at right angles. The shield 40 extends from one side to the other of the housing 11 and is supported by channels 40b mounted in the frame 8 and to which the free edge portions of the flanges 40a are secured.

The twine breaking disks 39, in addition to their primary function, also act to assist the conveying means in progressing material toward the snapping rolls and, if provided in sufficient numbers, could be used as the sole conveying means of the feeder.

The feeder of the present invention has been amply and successfully demonstrated in practical use thereof. The construction is rugged, simple and inexpensive and is such that wear and depreciation of the moving parts are very slow. The feeder can of course be built into a corn shredder or other machine at the time of manufacture of the machine or may be constructed for attachment to a machine which has been previously or independently manufactured.

While the embodiment of the invention which has been illustrated and described is applied to a corn shredder and is particularly adapted for use therewith, it should be appreciated that the invention can be applied with considerable advantage to other types of machines having oppositely rotating rollers or cylinders between which material is to be fed.

It will, of course, be understood that various changes may be made in the form, details, proportions and arrangement of the parts, without departing from the scope of my invention, which, generally stated, consists in a device capable of carrying out the objects above set forth and in the novel parts and combinations of parts disclosed and defined in the appended claims.

What is claimed is:—

1. In a machine such as a corn shredder having oppositely acting rollers between which material is to be fed, feeding means operating beneath said material for feeding material forwardly to said rollers and a retarder acting on the upper strata of said material to retard movement of said upper strata relative to the lower strata, said retarder comprising a material engaging member mounted above said feeding means adjacent said rollers for rotation about an axis extending transversely of said feeding means and continuously acting automatic driving means for rotating said member during recurring similar periods of time in a predetermined direction and continuously acting connections between said driving means and said member for rotating said member in the opposite direction during other periods of time shorter than and occurring between said first mentioned periods of time.

2. In a machine such as a corn shredder having oppositely acting rollers between which material is to be fed, feeding means operating beneath the material for feeding material forwardly to said rollers and a retarder acting on the upper strata of said material to retard movement of said upper strata relative to the lower strata, said retarder comprising a drum revolubly mounted above and transversely of said feeding means and adjacent said rollers, said drum having material engaging elements projecting from its periphery, and continuously acting automatic driving means for rotating said drum, said rotating means being arranged to rotate said drum during recurring similar periods of time in a predetermined direction and continuously acting connections between said driving means and said drum for rotating said drum in the opposite direction during other periods of time shorter than and occurring between said first mentioned periods of time.

3. In a machine such as a corn shredder having oppositely acting rollers between which material is to be fed, feeding means operating beneath the material for feeding material forwardly to said rollers and retarding means acting on the upper strata of said material to retard movement of said upper strata relative to the lower strata, said retarder comprising a material engaging member revolubly mounted for rotation about an axis situated above and transversely of said feeding means adjacent said rollers, an element mounted for rotation about an axis substantially coinciding with said first mentioned axis, means for rotating said element, a second element mounted on said first mentioned element for rotation with respect thereto about an axis radially spaced from and substantially parallel to the axis of rotation of said first mentioned element, means for rotating said last mentioned element relative to said first mentioned element and an elongated member pivotally connected at one of its ends to an eccentrically located portion of said last mentioned element and at its other end to a portion of said material engaging member radially spaced from said first mentioned axis whereby said material engaging member will be rotated and its resultant direction of rotation will comprise the combination of one component continuous in direction and a second component alternating in direction, the respective speeds of said two rotating means being such that the maximum speed of said alternating component will exceed the speed of said continuous component.

4. In a machine such as a corn shredder having oppositely acting rollers between which material is to be fed, feeding means operating beneath the material for feeding material forwardly to said rollers and retarding means acting on the upper strata of said material to retard movement of said upper strata relative to the lower strata, said retarder comprising a material engaging member revolubly mounted for rotation about an axis situated above and transversely of said feeding means adjacent said rollers, an arm extending radially from said axis and mounted for rotation thereabout, means for rotating said arm, an element mounted on said arm for rotation about an axis radially spaced from and parallel to said first mentioned axis, means for rotating said element relative to said arm and a link pivotally connected at one end to an eccentrically located portion of said element and at its other end to a point on said material engaging member radially spaced from said first mentioned axis whereby said material engaging member will be rotated and the resultant speed and direction of rotation thereof will comprise the combination of one component continuous in direction and speed and a second component varying in speed and alternating in direction.

5. In a machine such as a corn shredder having oppositely acting rollers between which material is to be fed, feeding means operating beneath the material for feeding material forwardly to said rollers and a retarder acting on the upper strata of material to retard movement of said upper strata relative to the lower strata, said retarder comprising a drum mounted revolubly on a shaft situated above and transversely of said feeding means and adjacent said rollers, said drum having material engaging elements projecting from its periphery, an arm secured to and extending radially from said shaft, a gear revolubly mounted on a pin attached to the outer portion of said arm parallel to said shaft, a link pivotally connected at its respective ends to an eccentrically located point on said gear and to a point on said drum radially spaced from said shaft, a second gear revolubly mounted on said shaft and meshed with said first mentioned gear, means for rotating said shaft at a predetermined speed and means for rotating said second gear at another speed whereby the resultant rotation of said drum will comprise the combination of one component continuous in direction and a second component alternating in direction.

6. In a machine such as a corn shredder, a feed retarder below which fed material is adapted to be moved and acting on the upper strata of fed material to retard movement of the upper strata relative to the lower strata, said retarder comprising a material engaging member mounted for rotation about an axis extending transversely relative to the direction of movement of the fed material, continuously acting driving means rotating said member during recurring similar periods of time in a predetermined direction and continuously acting connections between said driving means and said member rotating said member in the opposite direction during other periods of time shorter than and occurring between said first mentioned periods of time.

7. In a machine such as a corn shredder having oppositely acting rollers between which material is to be fed, feeding means operating beneath said material for feeding material forwardly to said rollers, a material engaging member mounted above said feeding means adjacent said rollers for rotation about an axis extending transversely of said feeding means and means imparting in repeated fixed cycles intermittent rotational movement to said material engaging member first through a certain arc in one direction and thence through a certain arc less than said first mentioned arc in the opposite direction whereby said material engaging member will act on the upper strata of the fed material to retard movement of the upper strata relative to the lower strata.

8. The structure defined in claim 7, said member comprising a drum having material engaging teeth on its periphery.

WALTER W. P. STELTER.